US008660778B2

(12) United States Patent
Taguchi

(10) Patent No.: US 8,660,778 B2
(45) Date of Patent: Feb. 25, 2014

(54) RUNNING PLAN CREATING APPARATUS

(75) Inventor: Koji Taguchi, Isehara (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 375 days.

(21) Appl. No.: 13/027,572

(22) Filed: Feb. 15, 2011

(65) Prior Publication Data

US 2011/0137562 A1    Jun. 9, 2011

Related U.S. Application Data

(63) Continuation of application No. 12/182,401, filed on Jul. 30, 2008, now abandoned.

(30) Foreign Application Priority Data

Aug. 3, 2007  (JP) .................................. 2007-203491

(51) Int. Cl.
| G08G 1/00 | (2006.01) |
| G08G 1/015 | (2006.01) |
| G08G 1/123 | (2006.01) |
| G08G 1/16 | (2006.01) |

(52) U.S. Cl.
USPC ........... 701/117; 701/118; 701/119; 340/903; 340/933; 340/989; 340/994; 340/436; 382/104; 348/118

(58) Field of Classification Search
USPC ............. 701/1, 117–119, 200–202, 207–210, 701/300, 301; 340/901, 903, 907, 933, 935, 340/936, 989, 994, 436; 382/104; 348/113, 348/118
See application file for complete search history.

(56) References Cited

U.S. PATENT DOCUMENTS

| 2004/0011582 A1* | 1/2004 | Aoki ............................. 180/274 |
| 2005/0143911 A1 | 6/2005 | Ishibashi et al. |
| 2006/0031015 A1 | 2/2006 | Paradie |

FOREIGN PATENT DOCUMENTS

| JP | A-2001-294116 | 10/2001 |
| JP | A-2003-237407 | 8/2003 |
| JP | 2005056372 A * | 3/2005 |
| JP | A-2005-56372 | 3/2005 |
| JP | 2005263026 A * | 9/2005 |
| JP | A-2005-263026 | 9/2005 |
| JP | A-2006-154967 | 6/2006 |
| JP | A-2006-277058 | 10/2006 |
| JP | A-2007-203491 | 8/2007 |
| JP | A-2008-108086 | 5/2008 |
| WO | WO 2006/070865 A1 | 7/2006 |

* cited by examiner

*Primary Examiner* — Thomas Tarcza
*Assistant Examiner* — Adam Tissot
(74) *Attorney, Agent, or Firm* — Oliff PLC

(57) ABSTRACT

A running plan creating apparatus for creating a running plan including position information of a vehicle at each time comprises road information acquiring means for acquiring road information concerning a running path for the vehicle to run, action predicting means for predicting positions and speeds of other vehicles running about the vehicle at each time by utilizing the road information, characteristic information acquiring means for acquiring characteristic information in each of the other vehicles, risk degree estimating means for estimating respective degrees of risk of the other vehicles by utilizing the characteristic information, risk degree distribution setting means for setting a risk degree distribution at each time on the running path by utilizing the road information and the positions and degrees of risk of the other vehicles, and running plan creating means for creating the running plan of the vehicle by utilizing the risk degree distribution.

8 Claims, 12 Drawing Sheets

Fig.2

| TYPE \ SIZE | | LENGTH ○○~○○ WIDTH ×××× | | LENGTH △△~△△ WIDTH ◎◎~◎◎ | | LENGTH □□~□□ WIDTH ▽▽~▽▽ | | ⋮ |
|---|---|---|---|---|---|---|---|---|
| TRUCK | UNLOADED | MAX ACCELERATION CAPABILITY G-α | MAX DECELERATION CAPABILITY G-β | UNLOADED | MAX ACCELERATION CAPABILITY G | MAX DECELERATION CAPABILITY G | UNLOADED | MAX ACCELERATION CAPABILITY G | MAX DECELERATION CAPABILITY G | ⋮ |
| | FULLY LOADED | MAX ACCELERATION CAPABILITY G-γ | MAX DECELERATION CAPABILITY G-η | FULLY LOADED | MAX ACCELERATION CAPABILITY G | MAX DECELERATION CAPABILITY G | FULLY LOADED | MAX ACCELERATION CAPABILITY G | MAX DECELERATION CAPABILITY G | |
| BUS | UNLOADED | MAX ACCELERATION CAPABILITY G | MAX DECELERATION CAPABILITY G | UNLOADED | MAX ACCELERATION CAPABILITY G | MAX DECELERATION CAPABILITY G | UNLOADED | MAX ACCELERATION CAPABILITY G | MAX DECELERATION CAPABILITY G | ⋮ |
| | FULLY LOADED | MAX ACCELERATION CAPABILITY G | MAX DECELERATION CAPABILITY G | FULLY LOADED | MAX ACCELERATION CAPABILITY G | MAX DECELERATION CAPABILITY G | FULLY LOADED | MAX ACCELERATION CAPABILITY G | MAX DECELERATION CAPABILITY G | |
| PASSENGER CAR | UNLOADED | MAX ACCELERATION CAPABILITY G | MAX DECELERATION CAPABILITY G | UNLOADED | MAX ACCELERATION CAPABILITY G | MAX DECELERATION CAPABILITY G | UNLOADED | MAX ACCELERATION CAPABILITY G | MAX DECELERATION CAPABILITY G | ⋮ |
| | FULLY LOADED | MAX ACCELERATION CAPABILITY G | MAX DECELERATION CAPABILITY G | FULLY LOADED | MAX ACCELERATION CAPABILITY G | MAX DECELERATION CAPABILITY G | FULLY LOADED | MAX ACCELERATION CAPABILITY G | MAX DECELERATION CAPABILITY G | |
| ⋯ | | ⋯ | | ⋯ | | ⋯ | | ⋮ |

Fig. 10

| TYPE \ SIZE | LENGTH ○○~○○ WIDTH ××~×× | LENGTH △△~△△ WIDTH ◎◎~◎◎ | LENGTH □□~□□ WIDTH ▽▽~▽▽ | ⋮ |
|---|---|---|---|---|
| TRUCK | | ⋮ | ⋮ | ⋮ |
| BUS | | ⋮ | ⋮ | ⋮ |
| PASSENGER CAR | | ⋮ | ⋮ | ⋮ |
| ⋯ | ⋯ | ⋯ | ⋯ | ⋮ |

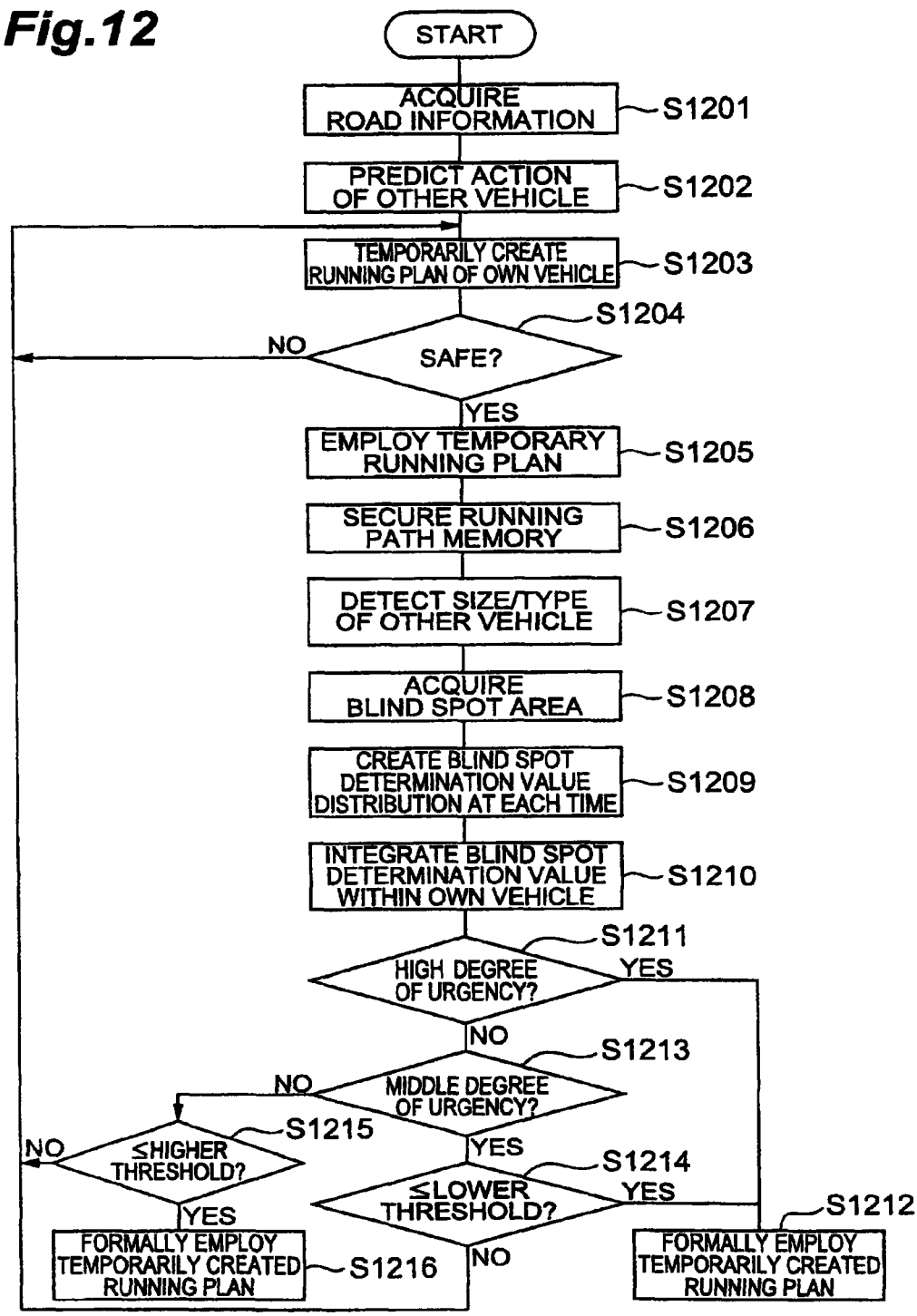

RUNNING PLAN CREATING APPARATUS

CROSS-REFERENCED TO RELATED APPLICATION

This application is a continuation of U.S. patent application Ser. No. 12/182,401, filed on Jul. 30, 2008, now abandoned which claims priority to Japanese Application No. 2007-203941 filed on Aug. 3, 2007. The entire disclosures of the prior applications are hereby incorporated herein by reference in their entirety.

BACKGROUND OF THE INVENTION

1. Field of the Invention

The present invention relates to a running plan creating apparatus which creates a safer running plan of a running vehicle by estimating the degree of risk of another vehicle thereabout.

2. Related Background Art

Concerning the own vehicle and obstacles on a road, an apparatus has been known which predicts positions from the present to T seconds thereafter, computes respective degrees of risk at the positions on the road, creates the risk-minimized running track where the sum of degrees of risk along the running path is minimized as the running path of the own vehicle, and presents it to the driver (e.g., Japanese Patent Application Laid-Open No. 2006-154967). This apparatus sets areas occupied by the obstacles and blind spot areas formed by the obstacles as locations with a degree of risk.

SUMMARY OF THE INVENTION

The above-mentioned conventional apparatus provides the areas occupied by the obstacles and blind spot areas formed by the obstacles with only a fixed degree of risk corresponding to the reliability of detection, but does not take account of respective kinetic energies, unstableness in running, blind spot areas, and the like of the other vehicles thereabout, thus failing to calculate the respective degrees of risk of the other vehicles. Therefore, thus created risk-minimized running track does not always yield high safety.

In view of circumstances mentioned above, it is an object of the present invention to provide a running plan creating apparatus which can create a safer running plan in consideration of the degree of risk of each of the other vehicles thereabout.

The running plan creating apparatus in accordance with the present invention is a running plan creating apparatus for creating a running plan including position information of a vehicle at each time, the apparatus comprising road information acquiring means for acquiring road information concerning a running path for the vehicle to run, action predicting means for predicting positions and speeds of other vehicles running about the vehicle at each time by utilizing the road information, characteristic information acquiring means for acquiring characteristic information in each of the other vehicles, risk degree estimating means for estimating respective degrees of risk of the other vehicles by utilizing the characteristic information, risk degree distribution setting means for setting a risk degree distribution at each time on the running path by utilizing the road information and the positions and degrees of risk of the other vehicles, and running plan creating means for creating the running plan of the vehicle by utilizing the risk degree distribution.

This running plan creating apparatus can acquire characteristic information in each of other vehicles running about the vehicle and estimate the degree of risk of each of the other vehicles by utilizing this information, so as to set a risk degree distribution. Therefore, a safer running plan can be obtained when created according to the risk degree distribution.

The characteristic information acquiring means may acquire a weight of the other vehicle as the characteristic information, while the risk degree estimating means may estimate the degree of risk to be higher as a kinetic energy based on the weight and speed of the other vehicle is higher. Since the damage at the time of a collision becomes greater as the vehicle has a higher kinetic energy, thus estimating the degree of risk to be higher as the kinetic energy is higher can create a running plan which evades running near such a vehicle, whereby potential risks can be reduced.

The characteristic information acquiring means may acquire a relative relationship between the other vehicle and a vehicle thereabout as the characteristic information. This allows the degree of risk to be estimated according to what characteristic the other vehicle has in terms of the relationship to the vehicle thereabout.

The characteristic information may include at least a desirable headway time or time to collision of the other vehicle with respect to a vehicle thereabout, while the risk degree estimating means may estimate the degree of risk to be higher as the desirable headway time or time to collision is shorter. Since a vehicle more likely to approach a vehicle thereabout has a higher possibility of coming into contact therewith, creating such a running plan as to evade running near such a vehicle can lower potential risks.

The characteristic information acquiring means may acquire a blind spot to become a blind spot for the driver of the other vehicle as the characteristic information, while the risk degree estimating means may estimate the degree of risk of each of the other vehicles by providing the blind spot area with a predetermined value. This can create such a running plan as to evade the blind spot for the driver of the other vehicle, so as to reduce the risk of accidents being caused by oversight of the drivers of the other vehicles.

Preferably, the running plan creating apparatus further comprises running condition setting means for setting a running condition of the vehicle, running plan temporarily creating means for temporarily creating a running plan of the vehicle achieving the running condition, integrated value computing means for computing an integrated value of degree of risk of the vehicle running according to the temporarily created running plan by utilizing the risk degree distribution, and urgency degree determining means for determining a degree of urgency of the running condition, while the running plan creating means creates such a running plan as to reduce the integrated value of degree of risk according to the degree of urgency. This can create a running plan whose degree of risk is lowered according to the degree of urgency of the running condition, e.g., whether it is essential or desirable.

Preferably, the running plan creating apparatus further comprises threshold selecting means for selecting a higher threshold as the degree of urgency is higher, while the running plan creating means creates such a running plan as to reduce the integrated value of the degree of risk when the integrated value exceeds the threshold. This can create such a running plan as to give a higher priority to the running condition as the degree of urgency is higher.

BRIEF DESCRIPTION OF THE DRAWINGS

FIG. 2 is a table showing the maximum acceleration capabilities G (in unloaded and fully loaded states) and maximum deceleration capabilities G (in unloaded and fully loaded states) for each kind of vehicles (vehicle type and size);

FIG. 10 is a table showing a blind spot area for each kind of vehicles (vehicle type and size);

FIG. 12 is a flowchart showing the running plan creating method in accordance with the third embodiment.

DESCRIPTION OF THE PREFERRED EMBODIMENTS

In the following, embodiments of the present invention will be explained in detail with reference to the accompanying drawings. In the explanation of the drawings, the same constituents will be referred to with the same numerals or letters while omitting their overlapping descriptions.

First Embodiment

Figure 1:
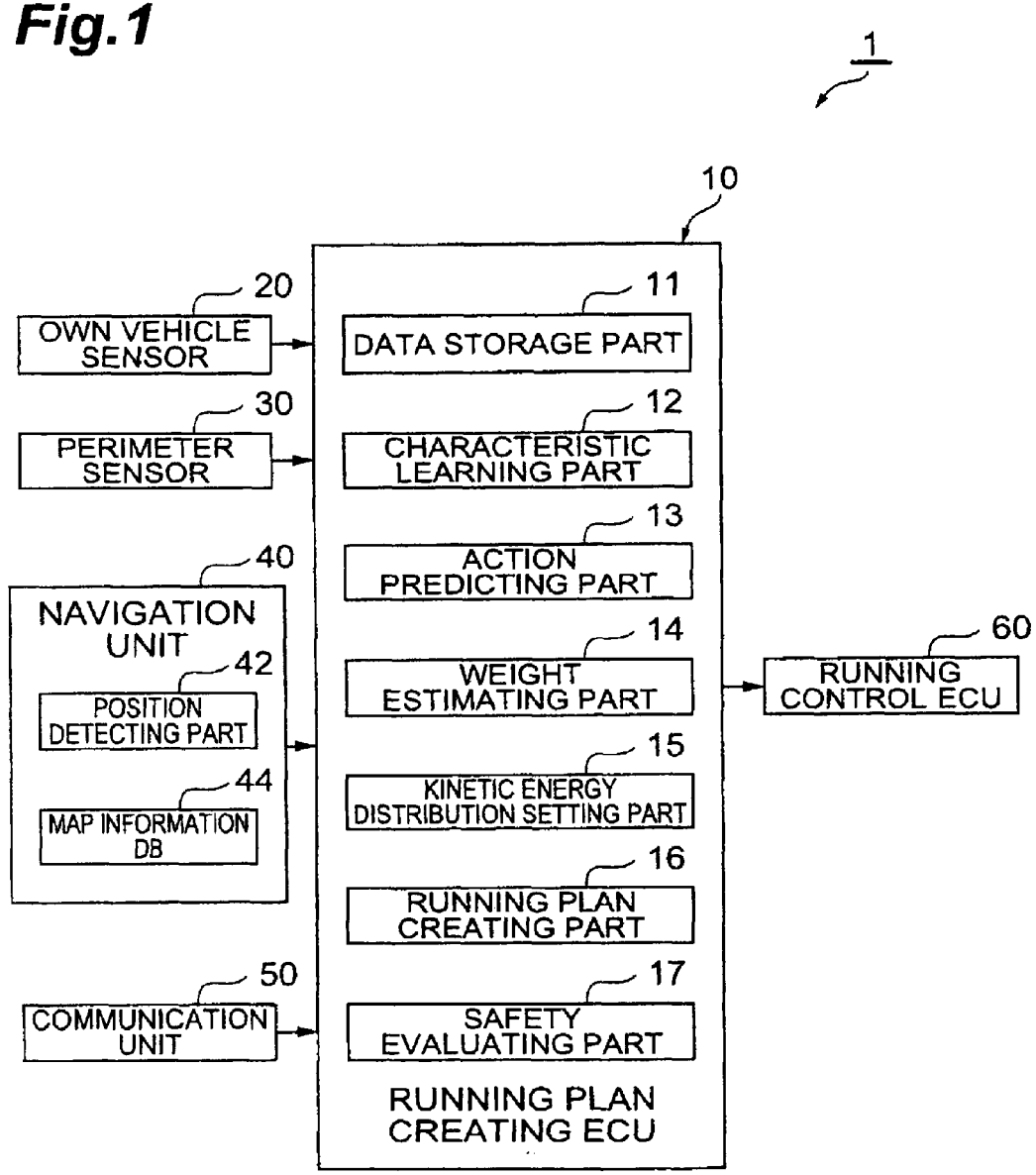
FIG. 1 is a block diagram showing the structure of the running plan creating apparatus in accordance with a first embodiment.

FIG. 1 is a block diagram showing the structure of the running plan creating apparatus in accordance with the first embodiment. As shown in FIG. 1, the running plan creating apparatus 1 comprises a running plan creating ECU (Electric Control Unit) 10 constructed by utilizing hardware such as a CPU (central processing unit), a memory, and the like and software, while being mounted to a vehicle (hereinafter also referred to as own vehicle) to be controlled which is under automatic driving control.

Connected to the running plan creating ECU 10 are an own vehicle sensor 20, a perimeter sensor 30, a navigation unit 40, and a communication unit 50 which are mounted to the own vehicle.

The own vehicle sensor 20 is a sensor for detecting the own vehicle state quantity, e.g., a vehicle speed sensor 22, acceleration sensor, yaw rate sensor, or steering angle sensor. The value detected by the own vehicle sensor 20 is used for computing an estimated value of state quantity of the own vehicle (e.g., vehicle speed, acceleration, yaw rate, or steering angle) at present from a vehicle model built in as software within the ECU 10.

The perimeter sensor 30 is a sensor for monitoring thereabout, such as a camera 32 or millimeter-wave radar 34. The value detected by the perimeter sensor 30 is used for recognizing other vehicles running about the own vehicle and compute other vehicle information such as relative distances, angles, and speeds with respect to the own vehicle.

The navigation unit (road information acquiring means) 40 is a device which guides the driver of the own vehicle in running. The navigation unit 40 has a position detecting part 42 and a map information database (DB) 44. The position detecting part 42 detects the position (positional coordinates) of the own vehicle by receiving a signal from a GPS satellite. The map information DB 44 stores road information such as road forms and road attributes. This can display the current position of the own vehicle on a map and guide the vehicle in running to a destination.

The communication unit 50 sends and receives information through road-vehicle communication and inter-vehicle communication. For example, in collaboration with infrastructures, the communication unit 50 acquires information about the road to run (road information acquiring means). The road information may be acquired from one or both of the above-mentioned navigation unit 40 and communication unit 50.

The running plan creating ECU 10 has a data storage part 11, a characteristic learning part 12, an action predicting part 13, a weight estimating part 14, a kinetic energy distribution setting part 15, a running plan creating part 16, and a safety evaluating part 17.

For a predetermined period in the past, the data storage part 11 stores the data detected by the own vehicle sensor 20 and perimeter sensor 30. Also, the data storage part 11 stores a table which indicates the maximum acceleration capabilities G (in unloaded and fully loaded states) and maximum deceleration capabilities G (in unloaded and fully loaded states) for each kind of vehicles (e.g., vehicle type and size) as performances of the vehicles as shown in FIG. 2.

As characteristics of the other vehicles running about the own vehicle, the characteristic learning part 12 learns acceleration and deceleration characteristics of the other vehicles. More specifically, the characteristic learning part 12 acquires the estimated value of state quantity of the own vehicle obtained by the own vehicle sensor 20 and the other vehicle information obtained by the perimeter sensor 30. The position information history of the own vehicle, the relative speeds and position information histories of the other vehicles, and the like are computed from thus acquired information, and the acceleration/deceleration histories of the other vehicles are estimated from these kinds of information. Then, the maximum acceleration G in the past is held as an acceleration characteristic. When determining the acceleration characteristic, the acceleration component due to downhills is eliminated for the sake of accuracy. The maximum deceleration G in the past is held as a deceleration characteristic. When determining the deceleration characteristic, the deceleration component due to uphills is eliminated for the sake of accuracy.

The action predicting part (action predicting means) 13 predicts actions of the other vehicles running about the own vehicle. More specifically, the action predicting part 13 acquires the estimated value of state quantity of the own vehicle obtained by the own vehicle sensor 20 and the other vehicle information obtained by the perimeter sensor 30. The position information history of the own vehicle, the relative position information histories and relative speeds of the other vehicles, and the like are computed from thus acquired information, and the position information histories and current states (speeds, accelerations, yaw angles with respect to road alignments, etc.) of the other vehicles are estimated from these kinds of information. This makes it possible to estimate the positional relationship between the other vehicles and tendencies of the other vehicles (drivers' likings such as headway, vehicle speed, acceleration/deceleration, and resistance to lane changes). The action predicting part 13 also acquires information about the running road (such as increases/decreases in lanes, merging, branching, alignments, and curves) from infrastructures and the like through the navigation unit 40 and communication unit 50. According to the position information histories and current states of the other vehicle and the road information, the tendencies of the other vehicles are put into a driver model which has been created beforehand, so as to predict actions (position, speed, and the like at each time (at predetermined time intervals)) of the other vehicles in future (e.g., in the range of about several hundreds of meters).

The weight estimating part (characteristic information acquiring means) 14 estimates the weights of the other vehicles running about the own vehicle. This weight estimation detects the size (length and width) and vehicle type (e.g., whether it is a truck, a passenger car, or the like according to its license plate) of each of the other vehicles from the detected data from the millimeter-wave radar 34 and camera 32. Subsequently, in the table shown in FIG. 2 stored in the data storage part 11, capability information is extracted from the relevant column of size and vehicle type. Namely, the maximum acceleration capabilities G (in unloaded and fully loaded states) and maximum deceleration capabilities G (in unloaded and fully loaded states) are extracted from the relevant column. Then, utilizing the maximum acceleration G learned in the characteristic learning part 12 and the extracted maximum acceleration capabilities G (in unloaded and fully loaded states), an accelerated estimated weight of the other vehicle is computed by linear interpolation. Also, utilizing the maximum deceleration G learned in the characteristic learning part 12 and the extracted maximum deceleration capabilities G (in unloaded and fully loaded states), a decelerated estimated weight of the other vehicle is computed by linear interpolation. The smaller of the accelerated estimated weight and decelerated estimated weight is taken as an estimated weight. The greater of them or their average may be taken as the estimated weight as well.

Utilizing the speed of the other vehicle predicted by the action predicting part 13 and the estimated weight obtained by the weight estimating part 14, the kinetic energy distribution setting part (risk degree estimating means and risk degree distribution setting means) 15 computes the kinetic energy (estimated weight speed speed) of the other vehicle at each time. This allows the kinetic energy to act as an index representing the degree of risk of the other vehicle, whereby the degree of risk can be estimated higher as the kinetic energy is higher.

Figure 3:
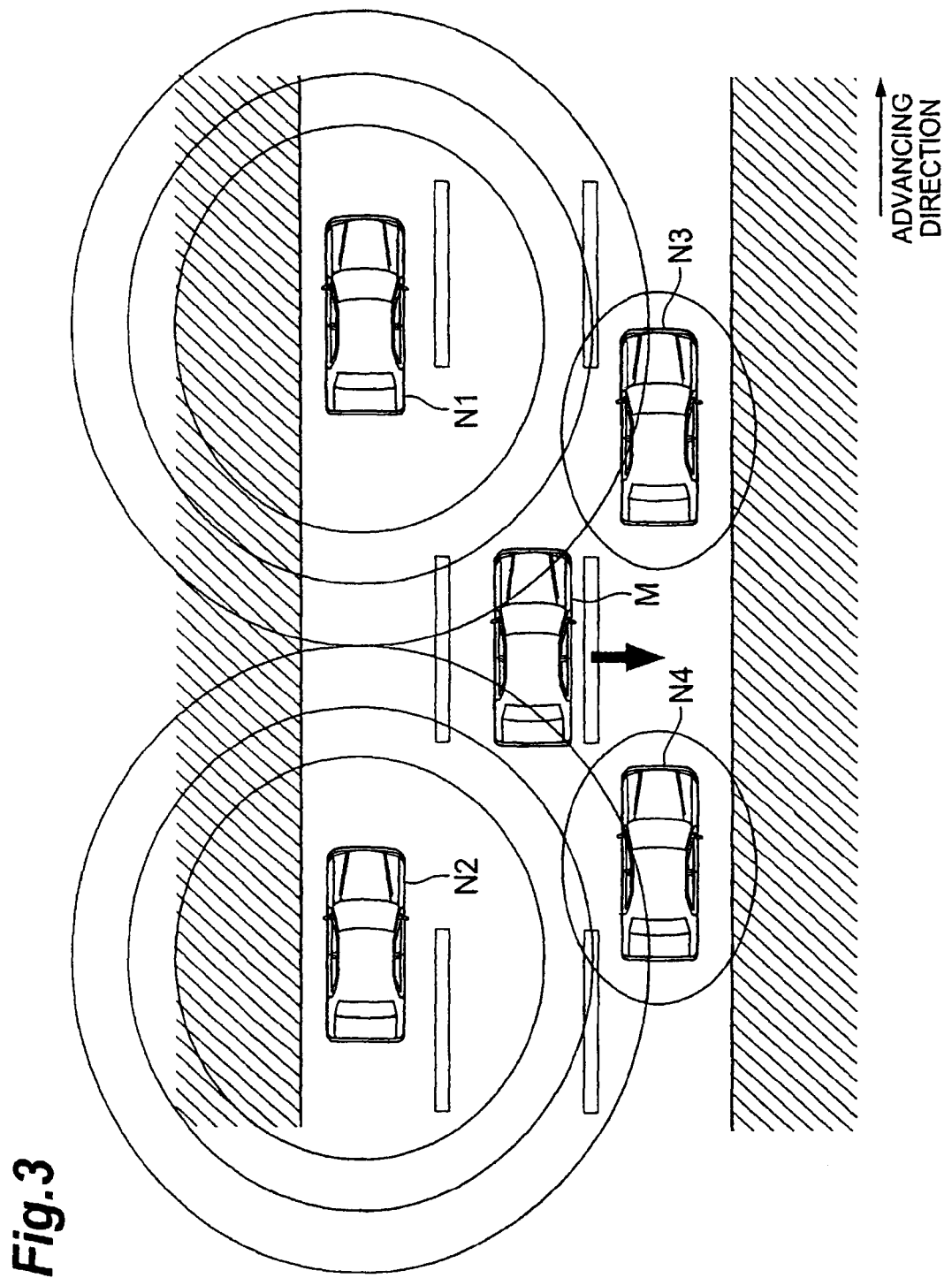
FIG. 3 is a view showing a kinetic energy distribution.

Also, the kinetic energy distribution setting part 15 acquires road information, sets a running path memory, and adds the computed kinetic energy to the running path memory in the area occupied by the other vehicle. A substantially circular energy distribution attenuating the kinetic energy by using a specified attenuation coefficient (which attenuates the kinetic energy by 1% per 1 m, for example) about the area occupied by the other vehicle is added to the running path memory. As shown in FIG. 3, this adds the kinetic energy to the running path memory for each of other vehicles N1 to N4 running about the own vehicle M, thereby setting a kinetic energy distribution as a whole. In FIG. 3, the kinetic energy distribution for each of the other vehicles N1 to N4 has such an image as to attain the highest energy in an area which is substantially the same as the outer shape occupied by the vehicle and attenuate the kinetic energy as it is distanced farther from this area. Such a kinetic energy distribution is set so as to extend to about several hundreds of meters ahead at each time at predetermined time intervals after the lapse of a predetermined time in future (e.g., after several seconds to several tens of seconds).

Utilizing thus set kinetic energy distribution, i.e., risk degree distribution, the running plan creating part (running plan creating means) 16 creates a running plan of the own vehicle M. Namely, the running plan including the position and speed of the own vehicle M is created so as to make the degree of risk lower. This will be explained later.

The safety evaluating part 17 finally evaluates the safety of the running plan created by the running plan creating part 16. More specifically, utilizing the information about the positions and speeds of the other vehicles N1 to N4 and the running plan including the position and speed of the own vehicle M created by the running plan creating part 16, the headway and relative vehicle speed are computed at predetermined time intervals. Then, TTC (Time To Collision) is computed by dividing thus determined headway by the relative speed. As a consequence, the safety of the running plan is evaluated according to whether the TTC is greater than a safety reference value or not. When the TTC exceeds the safety reference value, the running plan is evaluated as safe and employed. When the TTC is lower than the safety reference value, so that the running plan is evaluated unsafe, the running plan creating part 16 corrects the running plan. Then, the safety evaluating part 17 reevaluates the safety of the corrected running plan.

A running control ECU 60 is connected to the running plan creating ECU 10. While taking account of the estimated value of state quantity of the own vehicle M, the running control ECU 60 creates an instruction value for an actuator so as to faithfully reproduce the position and speed at each time according to the employed running plan.

Figure 4:
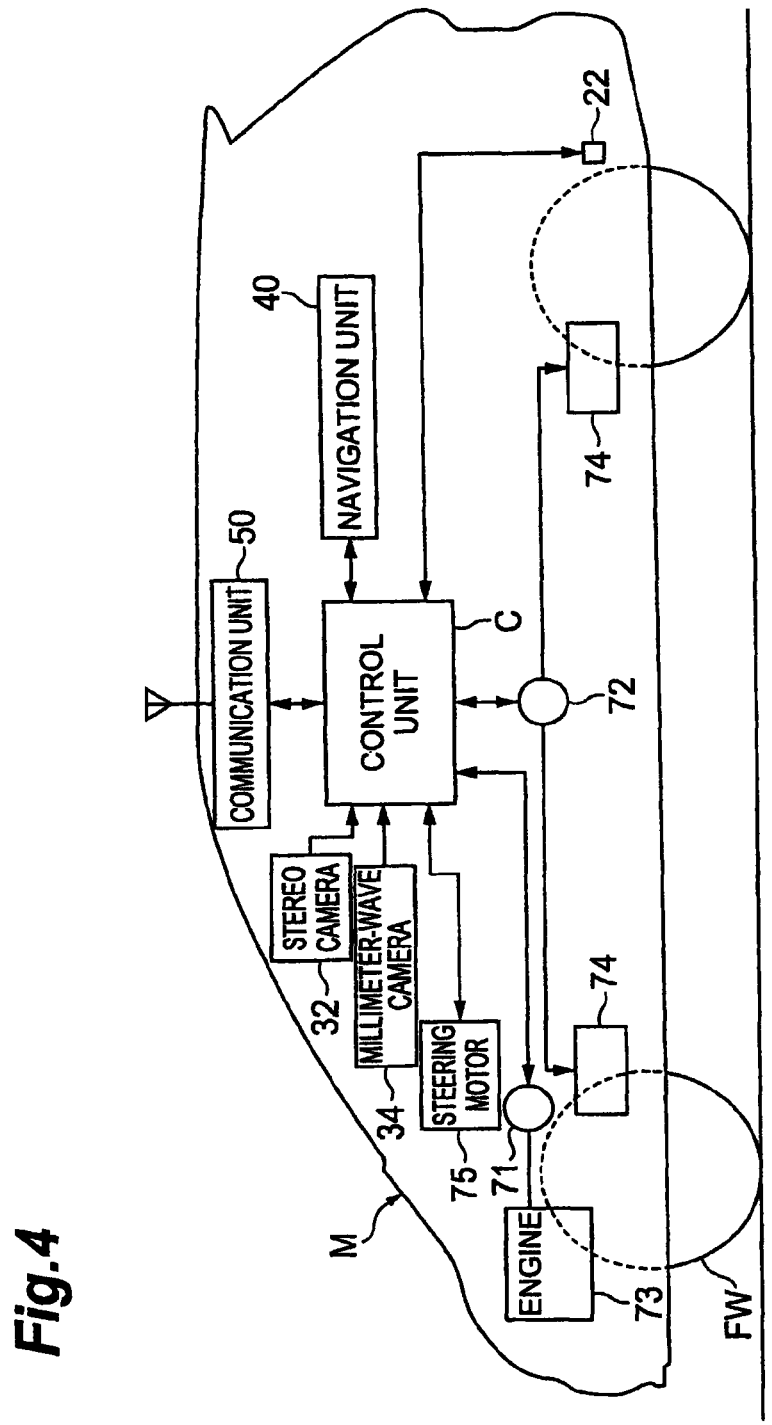
FIG. 4 is a schematic view showing a hardware structural example of a vehicle mounting the running plan creating apparatus of FIG. 1.

FIG. 4 is a schematic view showing a hardware structural example of the own vehicle M mounting the running plan creating apparatus 1 constructed as above. The running plan creating ECU 10 and running control ECU 60 are included in a control unit C. The millimeter-wave radar 34 and camera 32 acting as the perimeter sensor 30 are connected to the control unit C. Also, the vehicle speed sensor 22 acting as the own vehicle sensor 20 is connected to the control unit C. Further, the navigation unit 40 and communication unit 50 are connected to the control unit C.

When a running plan is created in the control unit C (running plan creating ECU 10), the control unit C (running control ECU 60) controls a throttle actuator 71 and a brake actuator 72, so as to regulate an engine 73 and brake units 74, thereby controlling acceleration/deceleration. Also, a steering motor 75 is controlled, so as to regulate an electric power steering unit, whereby steering control is performed.

Figure 5:
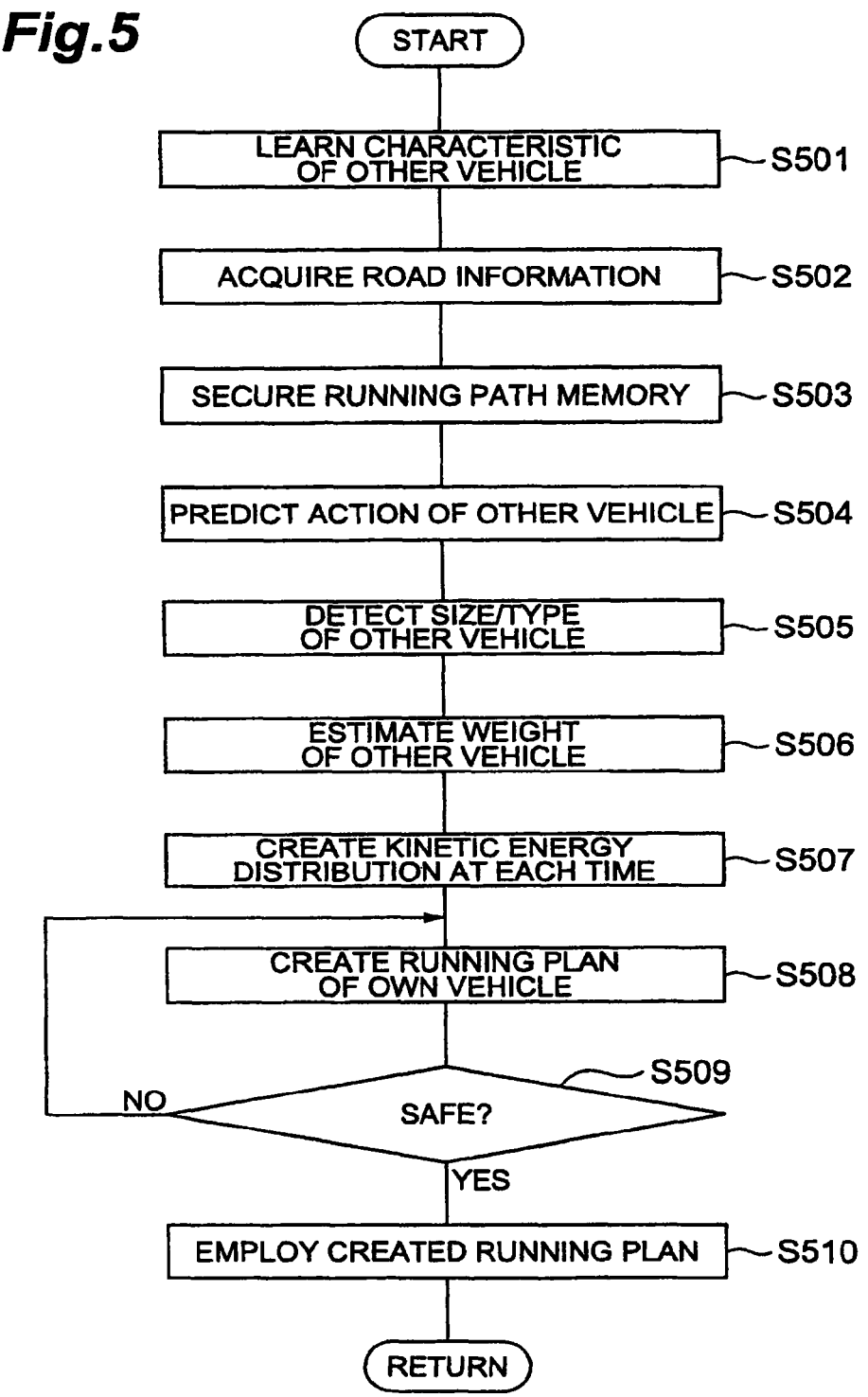
FIG. 5 is a flowchart showing the running plan creating method in accordance with the first embodiment.

A running plan creating method by the above-mentioned running plan creating apparatus 1 will now be explained with reference to the flowchart of FIG. 5.

To begin with, as a basis for the control, the table shown in FIG. 2 is prepared and stored in the data storage part 11 of the running plan creating ECU 10. This table is one indicating the maximum acceleration capabilities G (in unloaded and fully loaded states) and maximum deceleration capabilities G (in unloaded and fully loaded states) for each kind of vehicles (e.g., vehicle type and size) as performances of the vehicles. Preferably, the fully loaded state is a realistic value which covers illegal overloading.

The own vehicle sensor 20 and perimeter sensor 30 are supposed to have started acquiring data from a time earlier by a predetermined period than the present, while the data storage part 11 is assumed to store data for this period. The creating of the running plan begins from this state.

First, as characteristics of the other vehicles running about the own vehicle M, the acceleration and deceleration characteristics of the other vehicles are learned in the characteristic learning part 12 (step S501). More specifically, the characteristic learning part 12 acquires the estimated value of state quantity of the own vehicle M obtained by the own vehicle sensor 20 and the other vehicle information obtained by the perimeter sensor 30. The position information history of the own vehicle M, the relative speeds and position information histories of the other vehicles, and the like are computed from thus acquired information, and the acceleration/deceleration histories of the other vehicles are estimated from these kinds of information. Then, the maximum acceleration G in the past is held as an acceleration characteristic, while the maximum deceleration G in the past is held as a deceleration characteristic.

Next, road information concerning the running path is acquired from infrastructures through the navigation unit 40 and communication unit 50 (step S502). Then, a running path memory (e.g., for several hundreds of meters) for setting a kinetic energy distribution which will be explained later is secured and initialized (to zero) (step S503).

Next, actions of the other vehicles are predicted in the action predicting part 13 (step S504). More specifically, the action predicting part 13 acquires the estimated value of state quantity of the own vehicle M obtained by the own vehicle sensor 20 and the other vehicle information obtained by the perimeter sensor 30. The position information history of the own vehicle M, the relative position information histories and relative speeds of the other vehicles, and the like are computed from thus acquired information, and the position information histories and current states (speeds, accelerations, yaw angles with respect to road alignments, etc.) of the other vehicles are estimated from these kinds of information. This makes it possible to estimate the positional relationship between the other vehicles and tendencies of the other vehicles (drivers' likings such as headway, vehicle speed, acceleration/deceleration, and resistance to lane changes). According to the position information histories and current states of the other vehicle and the acquired road information, the tendencies of the other vehicles are put into a driver model which has been created beforehand, so as to predict actions (position, speed, and the like at each time (at predetermined time intervals)) of the other vehicles in future (e.g., in the range of about several hundreds of meters).

Next, the size (length and width) and vehicle type (e.g., whether it is a truck, a passenger car, or the like according to its license plate) of each of the other vehicles are detected in the weight estimating part 14 from the detected data from the millimeter-wave radar 34 and camera 32 (step S505). Subsequently, in the table shown in FIG. 2 stored in the data storage part 11, capability information is extracted from the relevant column of size and vehicle type. Namely, the maximum acceleration capabilities G (in unloaded and fully loaded states) and maximum deceleration capabilities G (in unloaded and fully loaded states) are extracted from the relevant column. Then, utilizing the maximum acceleration G learned in the characteristic learning part 12 and the extracted maximum acceleration capabilities G (in unloaded and fully loaded states), an accelerated estimated weight of the other vehicle is computed by linear interpolation. Also, utilizing the maximum deceleration G learned in the characteristic learning part 12 and the extracted maximum deceleration capabilities G (in unloaded and fully loaded states), a decelerated estimated weight of the other vehicle is computed by linear interpolation. Then, the smaller of the accelerated estimated weight and decelerated estimated weight is taken as an estimated weight of the other vehicle (step S506).

Utilizing the speed of the other vehicle predicted by the action predicting part 13 and the estimated weight obtained by the weight estimating part 14, the kinetic energy (estimated weight speed speed) of the other vehicle at each time is computed in the kinetic energy distribution setting part 15. Then, the kinetic energy distribution setting part 15 adds the computed kinetic energy to the running path memory in the area occupied by the other vehicle. A substantially circular energy distribution attenuating the kinetic energy by using a specified attenuation coefficient (which attenuates the kinetic energy by 1% per 1 m, for example) about the area occupied by the other vehicle is added to the running path memory. Thus, as shown in FIG. 3, the kinetic energy is added to the running path memory for each of other vehicles N1 to N4 running about the own vehicle M, whereby a kinetic energy distribution is set as a whole. Such a kinetic energy distribution is set so as to extend to about several hundreds of meters ahead at each time at predetermined time intervals after the lapse of a predetermined time in future (e.g., after several seconds to several tens of seconds) (step S507).

Using thus set kinetic energy distribution, i.e., risk degree distribution, a running plan of the own vehicle M is created in the running plan creating part 16 (step S508). Namely, the running plan including the position and speed of the own vehicle M is created so as to make the degree of risk lower. When the own vehicle M runs in the center lane as shown in FIG. 3, for example, it is seemingly safe. Since the other vehicles N1, N2 with high kinetic energies run in the left lane of the own vehicle M, however, the energy distributions of the other vehicles N1, N2 overlap the area occupied by the own vehicle M. On the other hand, while the headway between the other vehicles N3, N4 running in the right lane of the own vehicle M is short, their kinetic energies are low, whereby the degree of risk between the other vehicles N3, N4 is the lowest. Therefore, the running plan creating part 16 creates such a running plan as to perform a lane change between the other vehicles N3, N4. Thus, with reference to the kinetic energy distribution, a running plan including the position and speed of the own vehicle M is created so as to reduce the degree of potential risk.

Next, the safety of the running plan created by the running plan creating part 16 is finally evaluated in the safety evaluating part 17 (step S509). More specifically, utilizing the information about the positions and speeds of the other vehicles predicted by the action predicting part 13 and the running plan including the position and speed of the own vehicle M created by the running plan creating part 16, the headway and relative vehicle speed are computed at predetermined time intervals. Thus determined headway is divided by the relative speed, so as to compute the TTC (Time To Collision). As a consequence, the safety of the running plan is evaluated according to whether the TTC is greater than a safety reference value or not. When the TTC exceeds the safety reference value, the running plan is evaluated as safe and employed (step S510). When the TTC is lower than the safety reference value, so that the running plan is evaluated unsafe, the running plan creating part 16 corrects the running plan. Then, the safety evaluating part 17 reevaluates the safety of the corrected running plan.

When the running plan is thus employed, the running control ECU 60 creates an instruction value for an actuator so as to faithfully reproduce the position and speed at each time according to the employed running plan, while taking account of the estimated value of state quantity of the own vehicle M. Then, the throttle actuator 71 and brake actuator 72 are controlled, so as to regulate the engine 73 and brake units 74, thereby controlling acceleration/deceleration. Also, the steering motor 75 is controlled, so as to regulate an electric power steering unit, whereby steering control is performed.

As in the foregoing, the running plan creating apparatus 1 in accordance with this embodiment can estimate and acquire the vehicle weight as characteristic information in each of the other vehicles running about the own vehicle M, and can estimate a kinetic energy as the degree of risk of each of the other vehicle by utilizing the vehicle weight, so as set a risk degree distribution, whereby a safer running plan can be obtained when created according to the risk degree distribution. Namely, since the damage at the time of a collision becomes greater as the vehicle has a higher kinetic energy, thus estimating the degree of risk to be higher as the kinetic energy is higher can create a running plan which evades running near such a vehicle, whereby potential risks can be reduced.

Second Embodiment

The running plan creating apparatus in accordance with the second embodiment will now be explained. The same constituents as those of the above-mentioned embodiment will be referred to with the same numerals or letters while omitting their overlapping descriptions.

Figure 6:
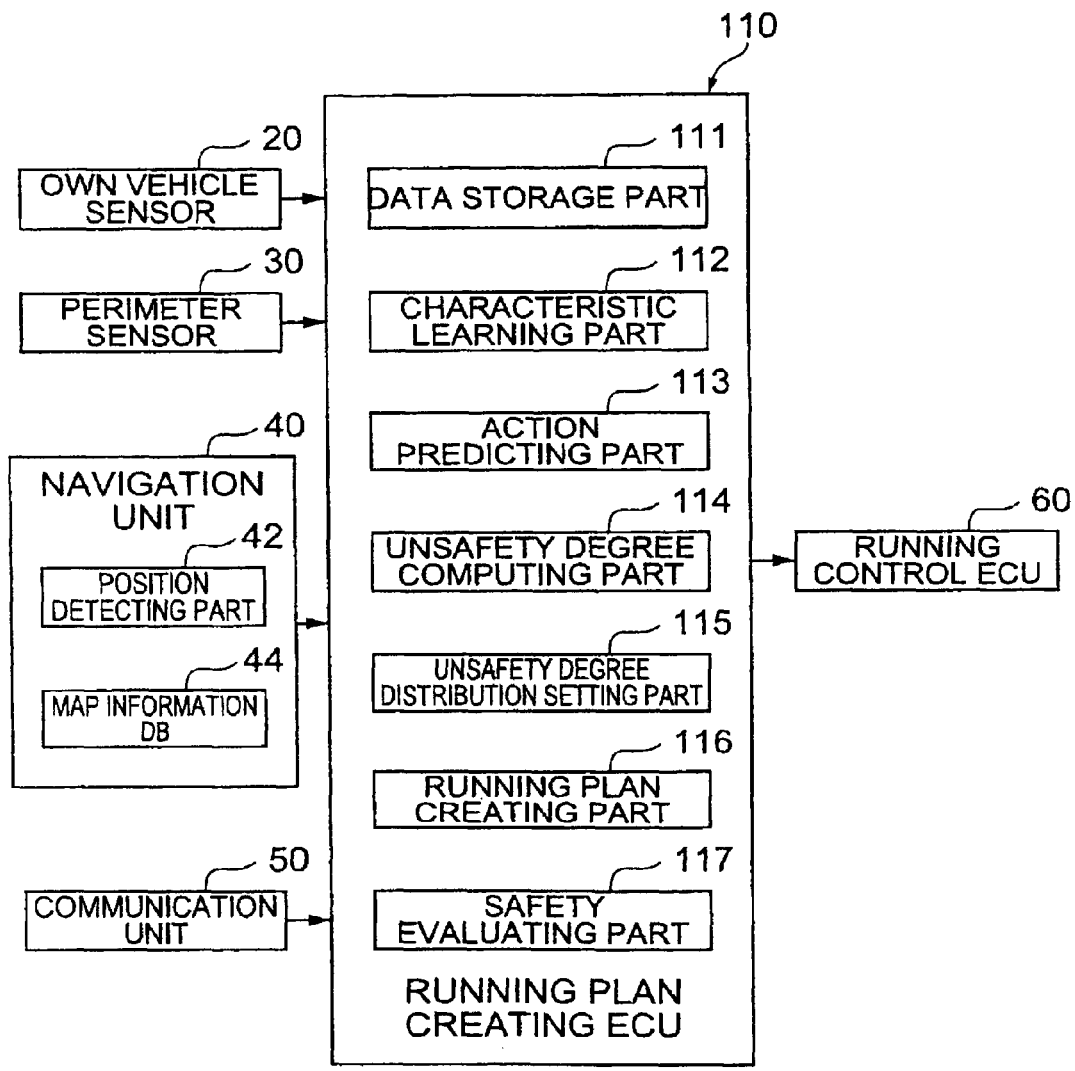
FIG. 6 is a block diagram showing the structure of the running plan creating apparatus in accordance with a second embodiment.

The running plan creating apparatus 101 in accordance with this embodiment differs from the running plan creating apparatus 1 in accordance with the first embodiment in the structure of its running plan creating ECU 110 as shown in FIG. 6. The running plan creating ECU 110 has a data storage part 111, a characteristic learning part 112, an action predicting part 113, an unsafety degree computing part 114, an unsafety degree distribution setting part 115, a running plan creating part 116, and a safety evaluating part 117.

For a predetermined period in the past, the data storage part 111 stores the data detected by the own vehicle sensor 20 and perimeter sensor 30. The data storage part 111 in this embodiment stores no table such as the one shown in FIG. 2.

As characteristics of the other vehicles running about the own vehicle, the characteristic learning part (characteristic information acquiring means) 112 learns relative relationships between each of the other vehicles and its nearby vehicles. More specifically, the characteristic learning part 112 learns at least one of the desirable headway time, permissible shortest time to collision, and desirable acceleration/deceleration for the other vehicle with respect to its nearby vehicle. All of them are learned in this embodiment.

The action predicting part (action predicting means) 113 is the same as the action predicting part 13 in the above-mentioned first embodiment.

Utilizing the desirable headway time A, permissible shortest time to collision (TTC) B, and desirable acceleration/deceleration C of the other vehicle with respect to its nearby vehicle learned by the characteristic learning part 112, the unsafety degree computing part (risk degree estimating means) 114 computes the degree of unsafety D of the other vehicle. Specifically, the degree of unsafety D of the other vehicle is represented by the following expression (1):

$$D = a/A + b/B + c \cdot C \quad (1)$$

where a, b, and c are predetermined coefficients. When the degree of unsafety D of the other vehicle is thus set as an index of the degree of risk, the degree of risk is estimated higher as desirable headway time A and time to collision B are shorter because the headway is short. The degree of risk is also estimated higher as the desirable acceleration/deceleration C is higher because the driving is rough.

Figure 7:
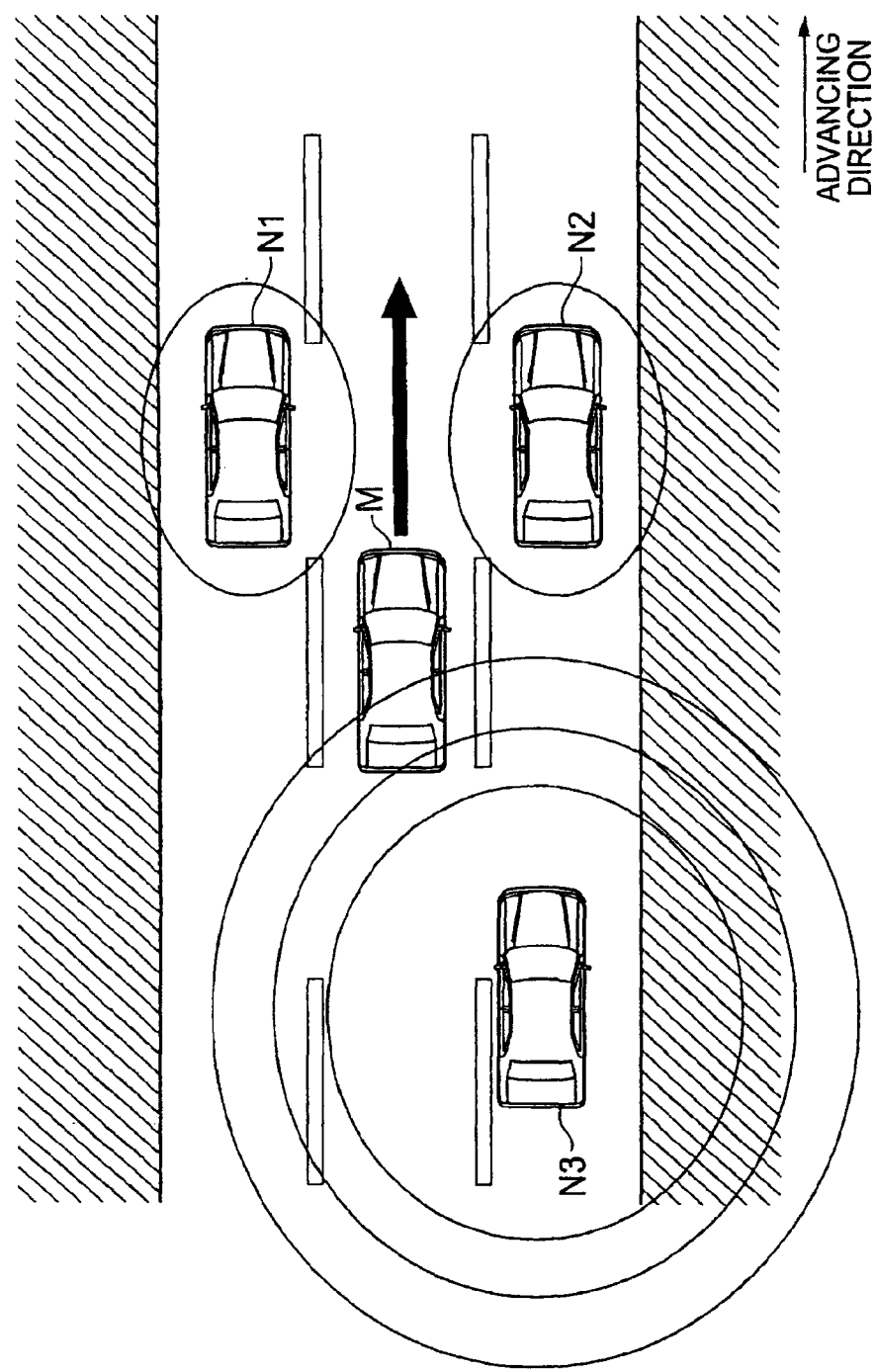
FIG. 7 is a view showing an unsafety degree distribution.

The unsafety degree distribution setting part (risk degree distribution setting means) 115 acquires road information, sets a running path memory, and adds the computed degree of unsafety D to the running path memory in the area occupied by the other vehicle. A substantially circular unsafety degree distribution attenuating the degree of unsafety D by using a specified attenuation coefficient (which attenuates the degree of unsafety by 1% per 1 m, for example) about the area occupied by the other vehicle is added to the running path memory. As shown in FIG. 7, this adds the degree of unsafety to the running path memory for each of other vehicles running about the own vehicle, thereby setting an unsafety degree distribution as a whole. In FIG. 7, the unsafety degree distribution for each of the other vehicles N1 to N3 has such an image as to attain the highest energy in an area which is substantially the same as the outer shape occupied by the vehicle and attenuate the kinetic energy as it is distanced farther from this area. Such an unsafety degree distribution is set so as to extend to about several hundreds of meters ahead at each time at predetermined time intervals after the lapse of a predetermined time in future (e.g., after several seconds to several tens of seconds).

Utilizing thus set unsafety degree distribution, i.e., risk degree distribution, the running plan creating part (running plan creating means) 116 creates a running plan of the own vehicle M. Namely, the creating of the running plan in the running plan creating part 116 is the same as that in the running plan in the running plan creating part 16 in accordance with the first embodiment except that the distribution utilized is the unsafety degree distribution.

The safety evaluating part 117 is the same as the safety evaluating part 17 in the first embodiment. The own vehicle sensor 20, perimeter sensor 30, navigation unit 40, communication unit 50, and running control ECU 60 are the same as those in the first embodiment.

Figure 8:
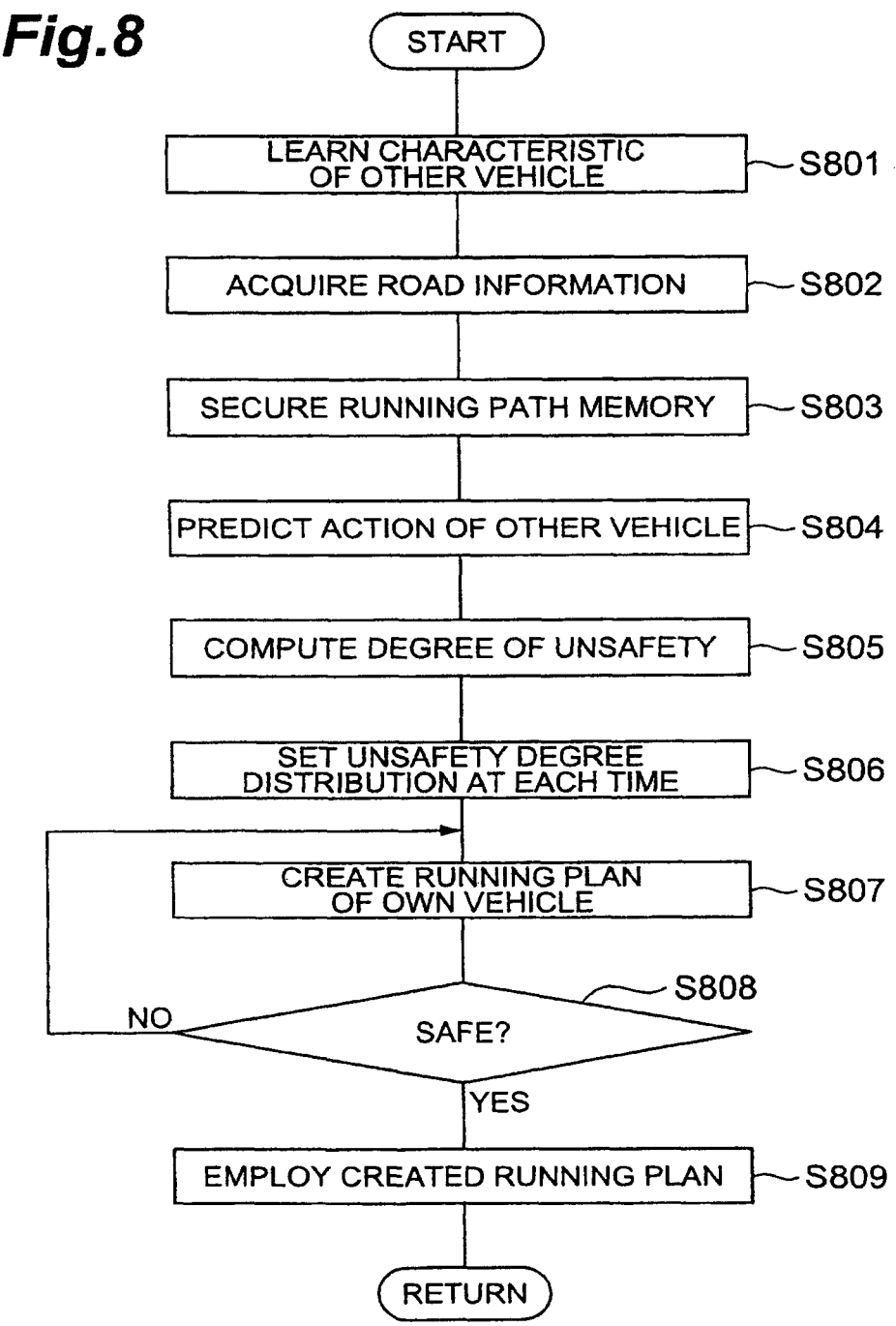
FIG. 8 is a flowchart showing the running plan creating method in accordance with the second embodiment.

A running plan creating method using the above-mentioned running plan creating apparatus 101 will now be explained with reference to the flowchart of FIG. 8.

The own vehicle sensor 20 and perimeter sensor 30 are supposed to have started acquiring data from a time earlier by a predetermined period than the present, while the data storage part 111 is assumed to store data for this period. The creating of the running plan begins from this state.

First, as characteristics of the other vehicles running about the own vehicle M, the desirable headway times, permissible shortest times to collision, and desirable accelerations/decelerations of the other vehicles with respect to their nearby vehicles are learned in the characteristic learning part 112 (step S801). More specifically, from the data storage part 111, the characteristic learning part 112 acquires the estimated value of state quantity of the own vehicle M obtained by the own vehicle sensor 20 and the other vehicle information obtained by the perimeter sensor 30. The position information history of the own vehicle M, the relative position information histories and relative speeds of the other vehicles, and the like are computed from thus acquired information, and the position information histories and acceleration/deceleration histories of the other vehicles are estimated from these kinds of information. Then, from thus obtained information, the desirable headway times, permissible shortest times to collision, and desirable accelerations/decelerations are computed and learned.

Next, road information concerning the running path is acquired from infrastructures through the navigation unit 40 and communication unit 50 (step S802). Then, a running path memory (e.g., for several hundreds of meters) for setting an unsafety degree distribution which will be explained later is secured and initialized (to zero) (step S803).

Next, actions of the other vehicles are predicted in the action predicting part 113 (step S804). More specifically, the action predicting part 113 acquires the estimated value of state quantity of the own vehicle M obtained by the own vehicle sensor 20 and the other vehicle information obtained by the perimeter sensor 30. Then, the position information history of the own vehicle M, the relative position information histories and relative speeds of the other vehicles, and the like are computed from thus acquired information, and the position information histories and current states (speeds, accelerations, yaw angles with respect to road alignments, etc.) of the other vehicles are estimated from these kinds of information. This makes it possible to estimate the positional relationship between the other vehicles and tendencies of the other vehicles (drivers' likings such as headway, vehicle speed, acceleration/deceleration, and resistance to lane changes). According to the position information histories and current states of the other vehicle and the acquired road information, the tendencies of the other vehicles are put into a driver model which has been created beforehand, so as to predict actions (position, speed, and the like at predetermined time intervals) of the other vehicles in future (e.g., in the range of about several hundreds of meters).

Subsequently, utilizing the desirable headway times, permissible shortest times to collision, and desirable acceleration/deceleration learned in the characteristic learning part 112, the degree of unsafety for each of the other vehicles is computed by using the above-mentioned expression (1) in the unsafety degree computing part 114 (step S805).

Next, in the unsafety degree distribution setting part, thus computed degree of unsafety is added to the running path memory of the area occupied by the other vehicle. Also, a substantially circular unsafety degree distribution attenuating the degree of unsafety by using a specified attenuation coefficient (which attenuates the degree of unsafety by 1% per 1 m, for example) about the area occupied by the other vehicle is added to the running path memory. As shown in FIG. 7, the degree of unsafety is thus added to the running path memory for each of the other vehicles running about the own vehicle, whereby an unsafety degree distribution is set as a whole. Such an unsafety degree distribution is set so as to extend to about several hundreds of meters ahead at each time at predetermined time intervals after the lapse of a predetermined time in future (e.g., after several seconds to several tens of seconds) (step S806).

Subsequently, utilizing thus set unsafety degree distribution, i.e., risk degree distribution, a running plan of the own vehicle is created in the running plan creating part 116 (step S807). Namely, the running plan including the position and speed of the own vehicle M is created so as to make the degree of risk lower. When the own vehicle M runs in the center lane as shown in FIG. 7, for example, it is seemingly safe. Since the other vehicle N3 with a higher degree of unsafety runs in the right lane in the rear of the own vehicle M, however, the unsafety degree distribution of the other vehicle N3 overlaps the area occupied by the own vehicle M. On the other hand, while the other vehicles N1, N2 in the right and left lanes in front of the vehicle run in parallel, their degrees of unsafety are low, so that the degree of unsafety between the other vehicles N1, N2 is the lowest. Therefore, the running plan creating part 116 creates a running plan including the position and speed of the own vehicle M by which the own vehicle M is accelerated away from the other vehicle N3 having the higher degree of unsafety, so as to go ahead by passing through the other vehicles N1, N2 in front thereof Next, the safety of the running plan created by the running plan creating part 116 is finally evaluated in the safety evaluating part 117 (step S808). More specifically, utilizing the information about the positions and speeds of the other vehicles predicted by the action predicting part 113 and the running plan including the position and speed of the own vehicle M created by the running plan creating part 116, the headway and relative vehicle speed are computed at predetermined time intervals. Thus determined headway is divided by the relative speed, so as to compute the TTC (Time To Collision). As a consequence, the safety of the running plan is evaluated according to whether the TTC is greater than a safety reference value or not. When the TTC exceeds the safety reference value, the running plan is evaluated as safe and employed (step S809). When the TTC is lower than the safety reference value, so that the running plan is evaluated unsafe, the running plan creating part 116 corrects the running plan. Then, the safety evaluating part 117 reevaluates the safety of the corrected running plan.

When the running plan is thus employed, the running control ECU 60 creates an instruction value for an actuator so as to faithfully reproduce the position and speed at each time according to the employed running plan, while taking account of the estimated value of state quantity of the own vehicle M. Then, the throttle actuator 71 and brake actuator 72 are controlled, so as to regulate the engine 73 and brake units 74, thereby controlling acceleration/deceleration. Also, the steering motor 75 is controlled, so as to regulate an electric power steering unit, whereby steering control is performed.

As in the foregoing, the running plan creating apparatus 101 in accordance with this embodiment can estimate and acquire the desirable headway time, permissible shortest time to collision, and desirable acceleration/deceleration as characteristic information in each of the other vehicles running about the own vehicle M, and can estimate a degree of unsafety as the degree of risk of each of the other vehicle by utilizing the information, so as set a risk degree distribution, whereby a safer running plan can be obtained when created according to the risk degree distribution. Namely, since the other vehicle is more likely to approach and come into contact with its nearby vehicle as its desirable headway time and time to collision are shorter, while the driving becomes rougher so as to yield a higher risk of contact as the desirable acceleration/deceleration is greater, whereby the degree of unsafety is estimated higher in such a case. Since a vehicle having a higher degree of unsafety yields a higher degree of potential risk, creating such a running plan as to evade running near such a vehicle can reduce potential risks.

Third Embodiment

The running plan creating apparatus in accordance with the third embodiment will now be explained. The same constituents as those of the above-mentioned embodiments will be referred to with the same numerals or letters while omitting their overlapping descriptions.

Figure 9:
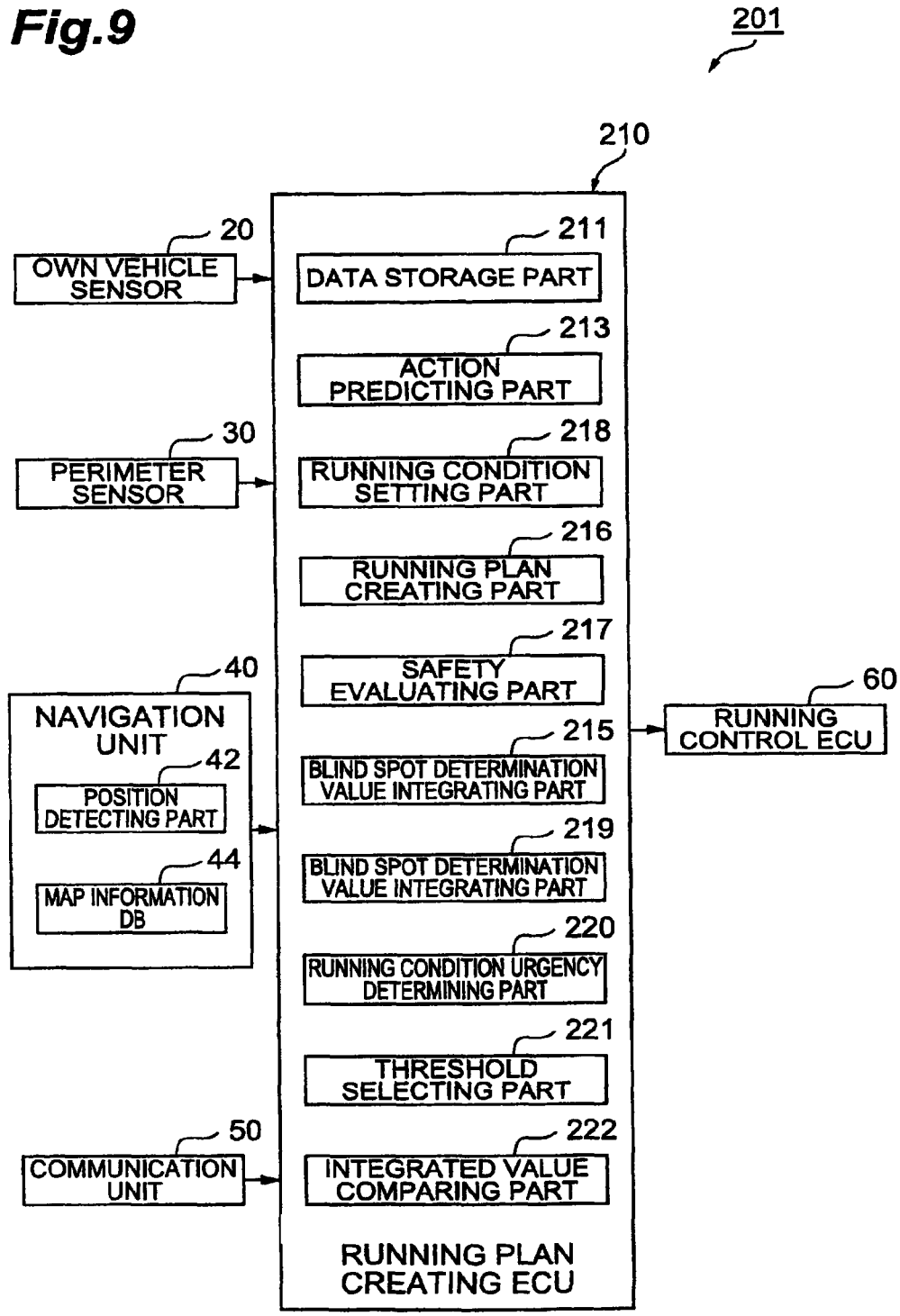
FIG. 9 is a block diagram showing the structure of the running plan creating apparatus in accordance with a third embodiment.

The running plan creating apparatus 201 in accordance with this embodiment differs from the running plan creating apparatus 1 in accordance with the first embodiment in the structure of its running plan creating ECU 210 as shown in FIG. 9. The running plan creating ECU 210 has a data storage part 211, an action predicting part 213, a running condition setting part 218, a running plan creating part 216, a safety evaluating part 217, a dead spot determination value distribution setting part 215, a dead spot determination value integrating part 219, a running condition urgency determining part 220, a threshold selecting part 221, and an integrated value comparing part 222.

For a predetermined period in the past, the data storage part 211 stores the data detected by the own vehicle sensor 20 and perimeter sensor 30. The data storage part 211 stores a table as shown in FIG. 10. Namely, a table indicating blind spot areas for each kind (e.g., vehicle type and size) of vehicles is stored.

The action predicting part 213 is the same as the action predicting part 13 in accordance with the above-mentioned first embodiment.

According to the actions (positions and speeds) of other vehicles predicted by the action predicting part 213 and road information, the running condition setting part (running condition setting means) 218 sets a running condition as an action policy to be taken by the own vehicle. Examples of the running condition include lane changes, right and left turns, and stops.

The running plan creating part (running plan temporarily creating means/running plan creating means) 216 temporarily creates a running plan including the position and speed of the own vehicle which achieves the set running condition.

The safety evaluating part 217, which is the same as the safety evaluating part 17 in the first embodiment, evaluates the safety of the running plan temporarily created by the running plan creating part 216. The temporary running plan is employed when determined safe. When the temporary running plan is determined unsafe, the running plan creating part corrects it. Then, the safety evaluating part 217 reevaluates the safety of the corrected running plan.

The blind spot determination value distribution setting part (characteristic information acquiring means/risk degree estimating means) 215 acquires dead spot areas of the other vehicles running about the own vehicle, and provides them with predetermined determination values, thereby setting a dead spot determination value distribution for each of the other vehicles. More specifically, this blind spot determination value distribution setting detects the size (length and width) and vehicle type (e.g., whether it is a truck, a passenger car, or the like according to its license plate) of each of the other vehicles from the detected data from the millimeter-wave radar 34 and camera 32. Subsequently, in the table shown in FIG. 10 stored in the data storage part 11, the blind spot area is extracted from the relevant column of size and vehicle type.

Figure 11:
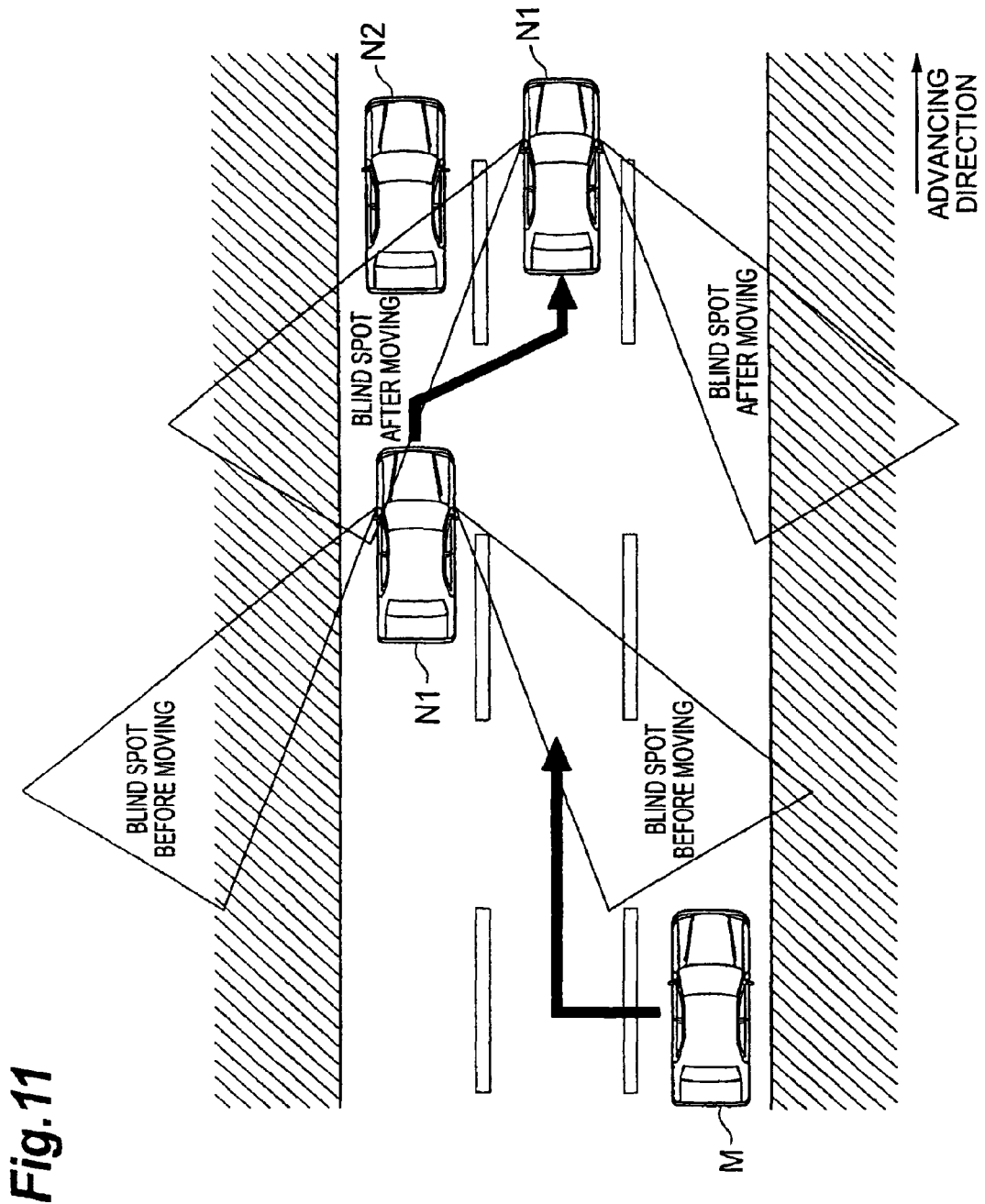
FIG. 11 is a view showing a blind spot determination value distribution.

A predetermined determination value is provided within the extracted blind spot area. When the dead spots of two other vehicles overlap each other, for example, this part is provided with a twofold determination value. When the other vehicle has been known to be a vehicle mounting a perimeter monitoring sensor, the probability of wrong operations by the driver of the other vehicle being prevented by an alarm and the like becomes higher, whereby the determination value may be increased by a specified coefficient (e.g., 50%). Thus, as shown in FIG. 11, a dead spot determination value is added to a running path memory for each of the other vehicles N1 and N2 running about the own vehicle M, whereby a blind spot determination value is set as a whole. Such a blind spot determining value distribution is set so as to extend to about several hundreds of meters ahead at each time at predetermined time intervals after the lapse of a predetermined time in future (e.g., after several seconds to several tens of seconds).

Utilizing the blind spot determined value distribution as a risk degree distribution, the blind spot determination value integrating part (integrated value computing means) 219 computes an integrated value of blind spot determination value of the own vehicle in the case of running in conformity to the temporarily created running plan. Namely, utilizing the blind spot determination value distribution at each time, the blind spot determination value within the area occupied by the own vehicle is acquired and then integrated with respect to time.

The running condition urgency determining part (urgency determining means) 220 determines the degree of urgency of the running condition set by the running condition setting part 218. The urgency is determined among three stages of high, middle, and low degrees in this embodiment. The high degree of urgency covers necessary control such as lane changes required by reductions in the number of lanes and inevitable stops such as emergency stops. The middle degree of urgency covers kinds of control to be performed if possible such as control for securing higher safety, e.g., by increasing the headway. The low degree of urgency covers the other kinds of control that may be performed or not, such as control for improving comfort.

As a threshold to be compared with the integrated value of blind spot determination value, the threshold selecting part (threshold selecting means) 221 selects a higher threshold as the degree of urgency is higher. Specifically, since the degree of urgency is determined among three stages, while the created running plan is employed regardless of the integrated value of blind spot determination value when the degree of urgency is high, a higher threshold is selected when the higher degree of urgency is determined between the respective cases where the degree of urgency is about middle and low, i.e., when the degree of urgency is determined "middle" than when determined "low". For example, the threshold values are selected from 100 and 50.

When the degree of urgency is determined "middle", the integrated value comparing part 222 compares the integrated value of blind spot determination value with the higher threshold (e.g., 100). When the integrated value of blind spot determination value is not greater than this threshold, the control plan is determined safe and employed. When the integrated value of blind spot determination value exceeds this threshold, on the other hand, this control plan is determined unsafe, whereby a control plan is temporarily created again so as to evade a part interfering with a blind spot area, for example.

When the degree of urgency is determined "low", the integrated value comparing part 222 compares the integrated value of blind spot determination value with the lower threshold (e.g., 50). When the integrated value of blind spot determination value is not greater than this threshold, the control plan is determined safe and employed. When the integrated value of blind spot determination value exceeds this threshold, on the other hand, this control plan is determined unsafe, whereby a control plan is temporarily created again so as to evade a part interfering with a blind spot area, for example.

The own vehicle sensor 20, perimeter sensor 30, navigation unit 40, communication unit 50, and running control ECU 60 connected to the running plan creating ECU 10 are the same as those in the first embodiment.

A running plan creating method using the above-mentioned running plan creating apparatus 201 will now be explained with reference to the flowchart of FIG. 12.

To begin with, as a basis for the control, the table shown in FIG. 10 is prepared and stored in the data storage part 11 of the running plan creating ECU 10. This table is one indicating the blind spot area for each kind of vehicles (e.g., vehicle type and size).

The own vehicle sensor 20 and perimeter sensor 30 are supposed to have started acquiring data from a time earlier by a predetermined period than the present, while the data storage part 11 is assumed to store data for this period. The creating of the running plan begins from this state.

First, road information concerning a running path is acquired from infrastructures through the navigation unit 40 and communication unit 50 (step S1201).

Next, actions of the other vehicles are predicted in the action predicting part 213 (step S1202). More specifically, the action predicting part 213 acquires the estimated value of state quantity of the own vehicle M obtained by the own vehicle sensor 20 and the other vehicle information obtained by the perimeter sensor 30. The position information history of the own vehicle M, the relative position information histories and relative speeds of the other vehicles, and the like are computed from thus acquired information, and the position information histories and current states (speeds, accelerations, yaw angles with respect to road alignments, etc.) of the other vehicles are estimated from these kinds of information. This makes it possible to estimate the positional relationship between the other vehicles and tendencies of the other vehicles (drivers' likings such as headway, vehicle speed, acceleration/deceleration, and resistance to lane changes). According to the position information histories and current states of the other vehicle and the acquired road information, the tendencies of the other vehicles are put into a driver model which has been created beforehand, so as to predict actions (position, speed, and the like at each time (at predetermined time intervals)) of the other vehicles in future (e.g., in the range of about several hundreds of meters).

Subsequently, with reference to the actions (positions and speeds) of the other vehicles predicted by the action predicting part 213, the running condition creating part 216 temporarily creates a running plan of the own vehicle (step S1203). When temporarily creating the running plan, a running condition as an action policy to be taken by the own vehicle is initially set in the running condition setting part 218 by utilizing the predicted actions (positions and speeds) of the other vehicles and acquired road information. Examples of the running condition include lane changes, right and left turns, and stops. The running plan of the own vehicle is temporarily created in the running plan creating part 216 so as to achieve the running condition.

Next, the safety of the running plan created by the running plan creating part 216 is evaluated in the safety evaluating part 217 (step S1204). More specifically, utilizing the information about the positions and speeds of the other vehicles predicted by the action predicting part 213 and the running plan including the position and speed of the own vehicle M temporarily created by the running plan creating part 216, the headway and relative vehicle speed are computed at predetermined time intervals. Thus determined headway is divided by the relative speed, so as to compute the TTC (Time To Collision). As a consequence, the safety of the running plan is evaluated according to whether the TTC is greater than a safety reference value or not. When the TTC exceeds the safety reference value, the running plan is evaluated as safe and employed (step S1205). When the TTC is lower than the safety reference value, so that the running plan is evaluated unsafe, the running plan creating part 216 corrects the running plan. Then, the safety evaluating part 217 reevaluates the safety of the corrected running plan.

Subsequently, a running path memory (e.g., for several hundreds of meters) for setting a blind spot determination value distribution which will be explained later is secured and initialized (to zero) (step S1206).

Next, in the blind spot determination value setting part 215, the size (length and width) and vehicle type (e.g., whether it is a truck, a passenger car, or the like according to its license plate) of each of the other vehicles are detected from the data obtained by the millimeter-wave radar 34 and camera 32 (step S1207). Subsequently, in the table shown in FIG. 10 stored in the data storage part 211, the blind spot area is extracted from the relevant column of size and vehicle type (step S1208). Then, a predetermined determination value is provided within the extracted blind spot area. When the dead spots of two other vehicles overlap each other, for example, this part is provided with a twofold determination value. When the other vehicle has been known to be a vehicle mounting a perimeter monitoring sensor, the probability of wrong operations by the driver of the other vehicle being prevented by an alarm and the like becomes higher, whereby the determination value may be increased by a specified coefficient (e.g., 50%). Thus, as shown in FIG. 11, a dead spot determination value is added to a running path memory for each of the other vehicles N1 and N2 running about the own vehicle M, whereby a blind spot determination value is set as a whole (step S1209). Such a blind spot determining value distribution is set so as to extend to about several hundreds of meters ahead at each time at predetermined time intervals after the lapse of a predetermined time in future (e.g., after several seconds to several tens of seconds).

Subsequently, utilizing the blind spot determination value distribution as a risk degree distribution, the integrated value of dead spot determination value in the case of running according to the temporarily created running plan is computed in the bind spot determination value integrating part 219 (step S1210). Namely, utilizing the blind spot determination value distribution at each time, the blind spot determination value within the area occupied by the own vehicle is acquired and integrated with respect to time.

Next, the degree of urgency of the running condition set by the running condition setting part 218 is determined in the running condition urgency determining part 220. First, it is determined whether the degree of urgency is "high" or not (step S1211). When the degree of urgency is "high", it is determined that the control is necessary or inevitable, whereby the temporarily created running plan is formally employed regardless of the blind spot determination value (step S1212). When the degree of urgency is not "high", it is determined whether the degree of urgency is "middle" or not (step S1213). When the degree of urgency is "middle", the higher threshold (e.g., 100) is selected in the threshold selecting part 221, and this threshold and the integrated value of blind spot determination value are compared with each other in the integrated value comparing part 222 (step S1214). When the integrated value of blind spot determination value is not higher than the threshold value, the temporarily created control plan is determined safe and formally employed (step S1212). When the integrated value of blind spot determination value exceeds this threshold, the control plan is determined unsafe, so that the flow returns to step S1203, where a control plan is temporarily created again so as to evade a part interfering with a blind spot, for example.

When it is determined at step S1213 that the degree of urgency is not "middle", the degree of urgency becomes "low" as a result. In this case, the lower threshold (e.g., 50) is selected in the threshold selecting part 221, and this threshold and the integrated value of blind spot determination value are compared with each other in the integrated value comparing part 222 (step S1215). When the integrated value of blind spot determination value is not greater than this threshold, this control plan is determined safe and formally employed (step S1216). When the integrated value of blind spot determination value exceeds this threshold, it is determined that the control plan is unsafe, whereby the flow shifts to step S1203, whereby a control plan is temporarily created again so as to evade a part interfering with a blind spot area, for example.

When the running plan is thus employed, the running control ECU 60 creates an instruction value for an actuator, while taking account of the estimated value of state quantity of the own vehicle M, so as to faithfully reproduce the position and speed at each time according to the employed running plan. Then, the throttle actuator 71 and brake actuator 74 are controlled, so as to regulate the engine 73 and brake units 74, thereby controlling acceleration/deceleration. Also, the steering motor 75 is controlled, so as to regulate an electric power steering unit, whereby steering control is performed.

As in the foregoing, the running plan creating apparatus 201 in accordance with this embodiment can acquire, as characteristic information in each of the other vehicles running about the own vehicle, a blind spot area which becomes a blind spot for the driver of the other vehicle, and can set a blind spot determination value distribution as a degree of risk of each of the other vehicles by utilizing thus acquired blind spot area. Therefore, a running plan can be created according to the risk degree distribution such as to evade blind spots of the drivers within an available range in conformity to the degree of urgency in the running condition, whereby the risk of accidents being caused by oversight of the drivers of the other vehicles can be reduced.

The present invention can be modified in various ways without being restricted to the above-mentioned embodiments. For example, actions of the other vehicles running about the own vehicle are estimated from past histories in the above-mentioned embodiments. When the other vehicles are automatically controlled vehicles, their running plans may be acquired through the communication unit 50, and the actions may be predicted according to thus acquired running plans. In this case, the weight information of the other vehicles estimated in the first embodiment may be received through the communication unit 50.

Though the above-mentioned embodiments explain the case where the running plan creating apparatus is mounted to the own vehicle, infrastructures may be provided with the running plan creating apparatus, so that a running plan created thereby may be received through a communication unit, such as to control the running of the own vehicle.

As explained in the foregoing, the running plan creating apparatus in accordance with the embodiments can create a safer running plan in consideration of the degree of risk of each of the other vehicles thereabout.

What is claimed is:

1. A running plan creating apparatus for creating a running plan including position information of a vehicle with which collision is supposed to be avoided;
the apparatus comprising:
a road information acquiring device configured to acquire road information concerning a running path for the vehicle to run;
an action predicting device configured to predict positions and speeds of other vehicles running about the vehicle by utilizing the road information;
a detecting device configured to detect a size and a vehicle type for each of the other vehicles;
a characteristic learning device configured to learn at least one of acceleration and deceleration characteristics for each of the other vehicles;
a data storage device configured to store at least one of maximum acceleration capability and maximum deceleration capability for each kind of vehicle size and type;
a characteristic information acquiring device configured to acquire characteristic information in each of the other vehicles absent contact with each of the other vehicles, wherein the characteristic information is obtained based on the size and the vehicle type detected by the detecting device;
a risk degree estimating device configured to estimate respective degrees of risk of the other vehicles by utilizing the characteristic information;
a risk degree distribution setting device configured to set a risk degree distribution on the running path by utilizing the road information and the positions and degrees of risk of the other vehicles; and
a running plan creating device configured to create the running plan of the vehicle by utilizing the risk degree distribution;
wherein the characteristic information acquiring device extracts at least one of maximum acceleration capability and maximum deceleration capability for each of the other vehicles from the data storage device based on the vehicle size and type detected by the detecting device, and calculates a weight of at least one of the other vehicles as the characteristic information using the extracted at least one of maximum acceleration capability and maximum deceleration capability and the at least one of acceleration and deceleration characteristics learned by the characteristic learning device; and
wherein the risk degree estimating device estimates the degree of risk to be higher as a kinetic energy based on the weight and speed of the at least one other vehicle is higher.

2. The running plan creating apparatus according to claim 1, wherein the characteristic information acquiring device acquires a relative relationship between the at least one other vehicle and a vehicle thereabout as the characteristic information.

3. The running plan creating apparatus according to claim 2, wherein the characteristic information includes at least a desirable headway time or time to collision of the at least one other vehicle with respect to the vehicle thereabout; and
wherein the risk degree estimating device estimates the degree of risk to be higher as the desirable headway time or time to collision is shorter.

4. The running plan creating apparatus according to claim 1, wherein the characteristic information acquiring device acquires a blind spot area to become a blind spot for the driver of the at least one other vehicle as the characteristic information; and
wherein the risk degree estimating device estimates the degree of risk of each of the other vehicles by providing the blind spot area with a predetermined value.

5. The running plan creating apparatus according to claim 4, further comprising:
a running condition setting device configured to set a running condition of the vehicle;
a running plan temporarily creating device configured to temporarily create a running plan of the vehicle achieving the running condition;
an integrated value computing device configured to compute an integrated value of degree of risk of the vehicle running according to the temporarily created running plan by utilizing the risk degree distribution; and
an urgency degree determining device configured to determine a degree of urgency of the running condition,
wherein the running plan creating device creates such a running plan as to reduce the integrated value of degree of risk according to the degree of urgency.

6. The running plan creating apparatus according to claim 5, further comprising a threshold selecting device configured to select a higher threshold as the degree of urgency is higher;
wherein the running plan creating device creates such a running plan as to reduce the integrated value of the degree of risk when the integrated value exceeds the threshold.

7. The running plan creating apparatus according to claim 1, wherein
the detecting device includes at least one of a radar device and a camera, and the size and the vehicle type of each of the other vehicles is detected by at least one of the radar device and the camera.

8. The running plan creating apparatus according to claim 7, wherein the detecting device includes the radar device and the camera, and the size and the vehicle type of each of the other vehicles is detected by the radar device and the camera.

* * * * *